US010769585B2

(12) United States Patent
Campbell (10) Patent No.: US 10,769,585 B2
(45) Date of Patent: Sep. 8, 2020

(54) SYSTEMS AND METHODS FOR AUTOMATED HARMONIZED SYSTEM (HS) CODE ASSIGNMENT

(71) Applicant: Walmart Apollo, LLC, Bentonville, AR (US)

(72) Inventor: Benjamin Douglas Campbell, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 79 days.

(21) Appl. No.: 16/127,655

(22) Filed: Sep. 11, 2018

(65) Prior Publication Data

US 2019/0080279 A1   Mar. 14, 2019

Related U.S. Application Data

(60) Provisional application No. 62/557,429, filed on Sep. 12, 2017.

(51) Int. Cl.
*G06Q 10/08* (2012.01)

(52) U.S. Cl.
CPC .................... *G06Q 10/087* (2013.01)

(58) Field of Classification Search
CPC .............. G06Q 10/08; G06Q 10/087
USPC .......... 705/303–305, 600, 14.1, 14.4, 28–32; 707/602, 740, 793
See application file for complete search history.

(56) References Cited

U.S. PATENT DOCUMENTS

| 6,934,692 | B1* | 8/2005 | Duncan | G06Q 20/10 705/14.4 |
| 7,725,406 | B2 | 5/2010 | Black et al. | |
| 7,792,863 | B2* | 9/2010 | Uy | G06Q 10/063 707/793 |
| 7,853,480 | B2 | 12/2010 | Taylor et al. | |
| 7,937,331 | B2 | 5/2011 | Mack | |
| 7,970,731 | B2* | 6/2011 | Potts | G06Q 10/00 707/602 |

(Continued)

FOREIGN PATENT DOCUMENTS

| WO | 2002027570 A2 | 4/2002 |
| WO | 2016057000 A1 | 4/2016 |

OTHER PUBLICATIONS

International Search Report and Written Opinion from International Patent Application No. PCT/US2018/050387 dated Nov. 9, 2018.

*Primary Examiner* — Andrew Joseph Rudy
(74) *Attorney, Agent, or Firm* — McCarter & English, LLP (57) ABSTRACT

Described in detail herein are systems and methods for HS code assignment. The system includes a data storage system that combines suppliers' quotes of items along with a classification database. The supplier quote can include tariff codes for all import items. The classification database can include all previously classified items. A first set of information associated with a new item is input into the system. The system can attempt to match the new item to a previously classified item based on the first set of information. If the system is unable to match the new item based on the first set of information the system can retrieve a second set of information including, the department/category to which the new item is assigned, along with the materials the new item is made up of and a description of the new item.

18 Claims, 8 Drawing Sheets

(56) References Cited

U.S. PATENT DOCUMENTS

| | | | | |
|---|---|---|---|---|
| 8,321,356 | B2 * | 11/2012 | Awaida | G06Q 30/0283 |
| | | | | 705/400 |
| 8,407,155 | B2 * | 3/2013 | Greco | G06Q 10/08 |
| | | | | 705/335 |
| 8,495,068 | B1 * | 7/2013 | Awalt | G06Q 30/06 |
| | | | | 707/740 |
| 8,725,656 | B1 | 5/2014 | Gill et al. | |
| 8,751,419 | B2 * | 6/2014 | Shimogori | G06N 20/00 |
| | | | | 706/12 |
| 8,903,825 | B2 * | 12/2014 | Parker | G06F 16/355 |
| | | | | 707/737 |
| 9,443,263 | B1 * | 9/2016 | Kim | G06Q 30/0635 |
| 9,710,498 | B2 * | 7/2017 | Kang | G06Q 10/06 |
| 9,894,049 | B2 * | 2/2018 | Sample | H04L 51/066 |
| 10,229,448 | B2 * | 3/2019 | Ahuja | G06Q 30/0631 |
| 2004/0243484 | A1 | 12/2004 | Smith | |
| 2011/0145107 | A1 | 6/2011 | Greco | |
| 2014/0136440 | A1 | 5/2014 | Ahmed et al. | |
| 2016/0275446 | A1 | 9/2016 | Song | |
| 2016/0379309 | A1 * | 12/2016 | Shikhare | G06Q 40/08 |
| | | | | 705/4 |

* cited by examiner

| bc item id | sku | item status | super department | dept nbr | department | category |
|---|---|---|---|---|---|---|
| BC-334425 | SKU-348125 | Staging | Packaged Goods | 90 | Dairy | Eggs |
| BC-334426 | SKU-348126 | Staging | Packaged Goods | 90 | Dairy | Eggs |
| BC-335054 | SKU-348754 | Staging | Packaged Goods | 91 | Frozen Foods | Seafood |
| BC-335055 | SKU-348755 | Staging | Packaged Goods | 91 | Frozen Foods | Seafood |
| BC-335058 | SKU-348758 | Staging | Packaged Goods | 91 | Frozen Foods | Seafood |
| BC-337430 | SKU-351130 | Staging | Packaged Goods | 95 | Snacks & Beverages | Mixers |
| BC-337431 | SKU-351131 | Staging | Packaged Goods | 95 | Snacks & Beverages | Mixers |
| BC-337432 | SKU-351132 | Staging | Packaged Goods | 95 | Snacks & Beverages | Mixers |
| BC-337433 | SKU-351133 | Staging | Packaged Goods | 95 | Snacks & Beverages | Mixers |
| BC-337434 | SKU-351134 | Staging | Packaged Goods | 91 | Frozen Foods | Seafood |
| BC-337897 | SKU-351597 | Staging | Packaged Goods | 91 | Frozen Foods | Seafood |
| BC-335056 | SKU-348756 | Staging | Packaged Goods | 91 | Frozen Foods | Seafood |
| BC-335143 | SKU-348843 | Staging | Packaged Goods | 91 | Frozen Foods | Seafood |
| BC-335075 | SKU-348775 | Staging | Packaged Goods | 91 | Frozen Foods | Seafood |
| BC-335199 | SKU-348899 | Staging | Packaged Goods | 91 | Frozen Foods | Seafood |
| BC-335048 | SKU-348748 | Staging | Packaged Goods | 91 | Frozen Foods | Seafood |
| BC-335181 | SKU-348881 | Staging | Packaged Goods | 91 | Frozen Foods | Seafood |
| BC-335047 | SKU-348747 | Staging | Packaged Goods | 91 | Frozen Foods | Appetizers |

SYSTEMS AND METHODS FOR AUTOMATED HARMONIZED SYSTEM (HS) CODE ASSIGNMENT

CROSS-REFERENCE TO RELATED PATENT APPLICATION

This application claims priority to U.S. Provisional application: 62/557,429 filed on Sep. 12, 2017, the content of which is hereby incorporated by reference in its entirety

BACKGROUND

Identifying and assigning tariff and duty rates can require matching objects to one another. The matching of objects can be a slow and error-prone process.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the inventive aspects of the present disclosure. In the figures.

DETAILED DESCRIPTION

Described in detail herein are systems and methods for Harmonized System (HS) code assignment. The system includes a data storage facility that combines suppliers' quotes of items with a classification database. The supplier quotes of items can include tariff codes for all import items. The classification database can include all previously classified items. A first set of information associated with a new item is input into the system. The first set of information can include an item name, UPC code, and/or Vendor stock number. The system can attempt to match the new item to a previously classified item based on the first set of information. If the system is unable to match the new item based on the first set of information the system can retrieve a second set of information including, the department/category to which the new item is assigned, along with the materials or composition of the new item and a description of the new item. The system can attempt to match the new item to one or more items based on the second set of information. Based on the matching, the system can assign a percentage to each possible match to indicate how closely the new item matches each of the one or more items in the classification database. The system can execute a gap analysis to determine whether the assigned percentage meets and/or exceeds a threshold percentage and can assign the new item an HS code based on the gap analysis.

In one embodiment, the system can determine whether there is a difference in value between the one more items and the new item. In some embodiments, the system can determine whether the new item was previously classified and assigned a HS code. In some embodiments, the system can receive an image, weight and/or size of the new item. The system can use virtual image matching and/or weight and size matching to match the new item to previously classified items. The system can be configured to compare the materials which make up the new item with materials which make up each of the one or more item, and identify the at least one item of the one or more items in the classification database, based on the comparison of the materials which make up the new item with materials which make up each of the one or more items.

In one embodiment, the system can be configured to receive a second input associated with the new item. The second input can be an image of the new item. The system can be configured to compare the image of the new item to an image of each of the one or more items in the classification database, and identify the at least one item in the classification database based on the comparison of the image of new item to the image of each of the one or more items. The system can use machine-vision or video analytics to compare the image of the new item to the image of each of the one or more items.

In one embodiment, the system can be configured to calculate a difference between a value associated with the new item and a value associated with each of the one or more items. The system can fail to identify at least one item which matches the new item, in response to determining the difference is more than a threshold amount. The system can be configured to maintain historical data associated with assigning HS codes to each of the plurality of items in the data storage facility. The system can be configured to calculate a percentage representing an amount of similarity between the new item and at least one item in the classification database based on the historical data associated with assigning HS codes to each of the plurality of items in the classification database.

Figure 1:
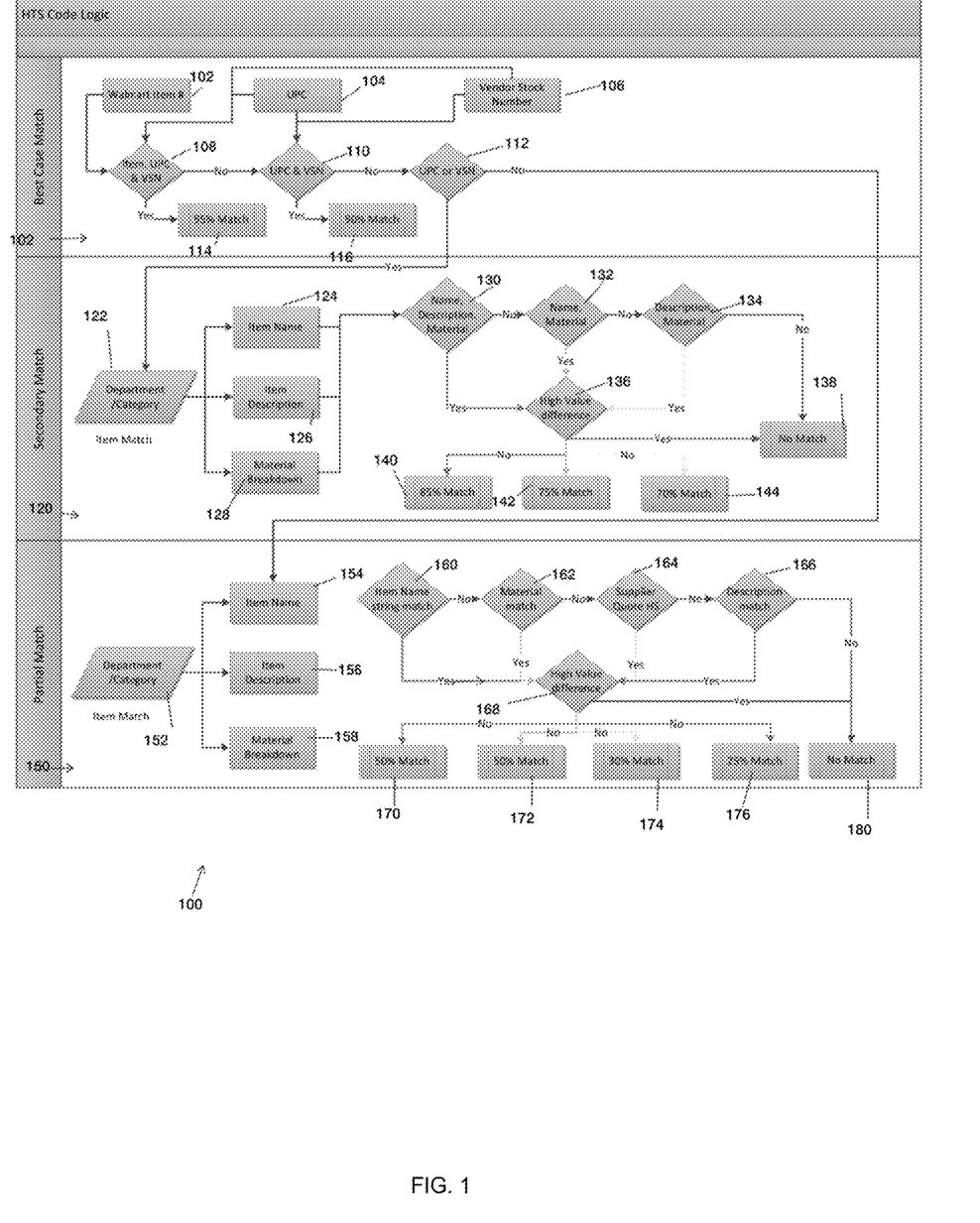
FIG. 1 illustrates a process of matching an item in a HS code assignment system in accordance with an exemplary embodiment.

FIG. 1 illustrates a process of matching an item in a HS code assignment system in accordance with an exemplary embodiment. The HS code assignment system can match newly items with items which have been previously assigned HS codes. The HS code assignment system can use an object matching process 100 that can include a best case match 102, a secondary match 120 and a partial match 150.

The best case match 102 can determine an item number, UPC and/or vendor stock number associated with new item in operations 102-106. In operation 108, the object matching process 100 can attempt to find an item that matches the new item based on the item number, UPC and vendor stock number of the new item. In operation 110, in response failing to finding an item that has an item number, UPC and vendor stock number that matches the item number, UPC and vendor stock of the new item, the object matching system 100 can attempt to find an item having a UPC and vendor stock number that matches the UPC and vendor stock number of the new item. In operation 112, in response to failing to finding an item that has a UPC and vendor stock number that matches the UPC and vendor stock number of the new item, an image matching process 100 can attempt to find an item with a matching UPC 104 or the vendor stock number 106 with that of the new item.

In response to finding an item with an item number 102, UPC 104 and/or vendor stock number 106 that matches the item number, UPC, and/or vendor stock number of the new item, the object matching system can assign a percentage to quantify a degree with which the item matches the new item, based on an amount of criteria of the one or more items matching the new item. As a non-limiting example, in operation 114, in response to the item number, UPC and vendor stock number 106 of the item matching the item number, UPC and vendor stock number of the new item, the image matching process 100 can calculate a 95% match. As a non-limiting example, in operation 116, in response to the item matching UPC and the vendor stock number with that of the new item, the image matching process 100 can calculate a 90% match.

In response to the object matching system 100 matching the UPC or the vendor stock number of the item with the UPC or the vendor stock number of the new item, the operation can be directed to the secondary match 120. In operation 122, the object matching process 100 can retrieve information for items in the same department and/or category as the new item. The object matching process 100 can determine the name, description, and material breakdown of the new item, in operations 124-128. In operation 130, the object matching system 100 can attempt to find an item with a name, description and material breakdown that matches a name, description and material breakdown of the new item. In operation 132, in response to failing to find an item with a name, description and material breakdown that matches the name, description and material breakdown of the new item, the object matching process 100 can attempt to find an item with a name and material breakdown that matches the name and material breakdown of the new item. In operation 134, in response to failing to find an item with a name and material breakdown that matches the name, description and material breakdown of the new item, the object matching process 100 can attempt to find an item a description and material breakdown that matches the description and material breakdown of the new item.

In operation 136, in response to finding an item having at least two of a name, description and/or material breakdown that match the name, description and/or material breakdown of the new item, the object matching process 100 can determine whether there is a high value difference 136 between the matched item and the new item. In operation 144, in response to failing to find an item having at least two of name, description and/or material breakdown that match the name, description and/or material breakdown of the new item, and/or determining there is a high value difference between the matched item and the new item, the object matching system 100 can determine that none of the items match the new item.

As a non-limiting example, in operation 140, in response to matching the name, description and material breakdown of an item with that of the new item, and determining there is not a high value difference between the item and the new item, the object matching process 100 can assign an 85% match between the matched item and the new item. As a non-limiting example, in operation 142, in response to matching the name and material breakdown, of an item with that of the new item, and determining there is not a high value difference between the item and the new item, the object matching process 100 can assign a 75% match between the matched item and the new item. As a non-limiting example, in operation 144, in response to matching the description and material breakdown, of an item with that of the new item, and determining there is not a high value difference between the item and the new item, the object matching process 100 can assign a 70% match between the matched item and the new item.

In response to the object matching process 100 failing to match the item number, UPC or vendor stock number of an item with the new item, the object matching process 100 can be directed to the partial match 150. In operation 152, the object matching process 100 can retrieve items of the same department and/or category as the new item. The object matching system 100 can determine the name, description and material breakdown of the new item in operation 154-158. In operation 160, the object matching process can attempt to find an item a name that matches the name of the new item. In operation 162, in response to failing to find an item with a name with that matches the name of the new item, the object matching process 100 can attempt find an item with a material breakdown that matches the material breakdown of the new item. In operation 164, in response to failing to find an item with a material breakdown that matches the material breakdown of the new item, the object matching process 100 can attempt to find an item with a supplier quote that matches a supplier quote of the new item. In operation 166, in response to failing to find an item with a supplier quote that matches the supplier quote of the new item, the object matching process 100 can attempt to find an item with a description that matches a description of the new item. In operation 168, in response to matching at least one of the name, material breakdown, previously assigned HS code, or description of an item with at least one of the name, material breakdown, previously assigned HS code, or description of the new item, the object matching process 100 can determine whether there is a high value difference between the matched item and the new item.

As a non-limiting example, in operation 170, in response to matching the name, of an item with the name of the new item, and determining there is not a high value difference between the item and the new item, the object matching process 100 can assign a 50% match between the matched item and the new item. As a non-limiting example, in operation 172, in response to matching the material breakdown, of an item with the material breakdown of the new item, and determining there is not a high value difference between the item and the new item, the object matching process 100 can assign a 50% match between the matched item and the new item. As a non-limiting example, in operation 174, in response to matching the previously assigned HS code, of an item with the new item, and determining there is not a high value difference between the item and the new item, the object matching process 100 can assign a 30% match between the matched item and the new item. As a non-limiting example, in operation 176, in response to matching the description of an item with the description of the new item, and determining there is not a high value difference between the item and the new item, the object matching process 100 can assign a 25% match between the matched item and the new item. In operation 178, in response to failing to match the name, material breakdown, previously assigned HS code, or description of an item with the name, material breakdown, previously assigned HS code or description of an item of the new item, the object matching system 100 can determine that none of the items match the new item.

Figure 2:
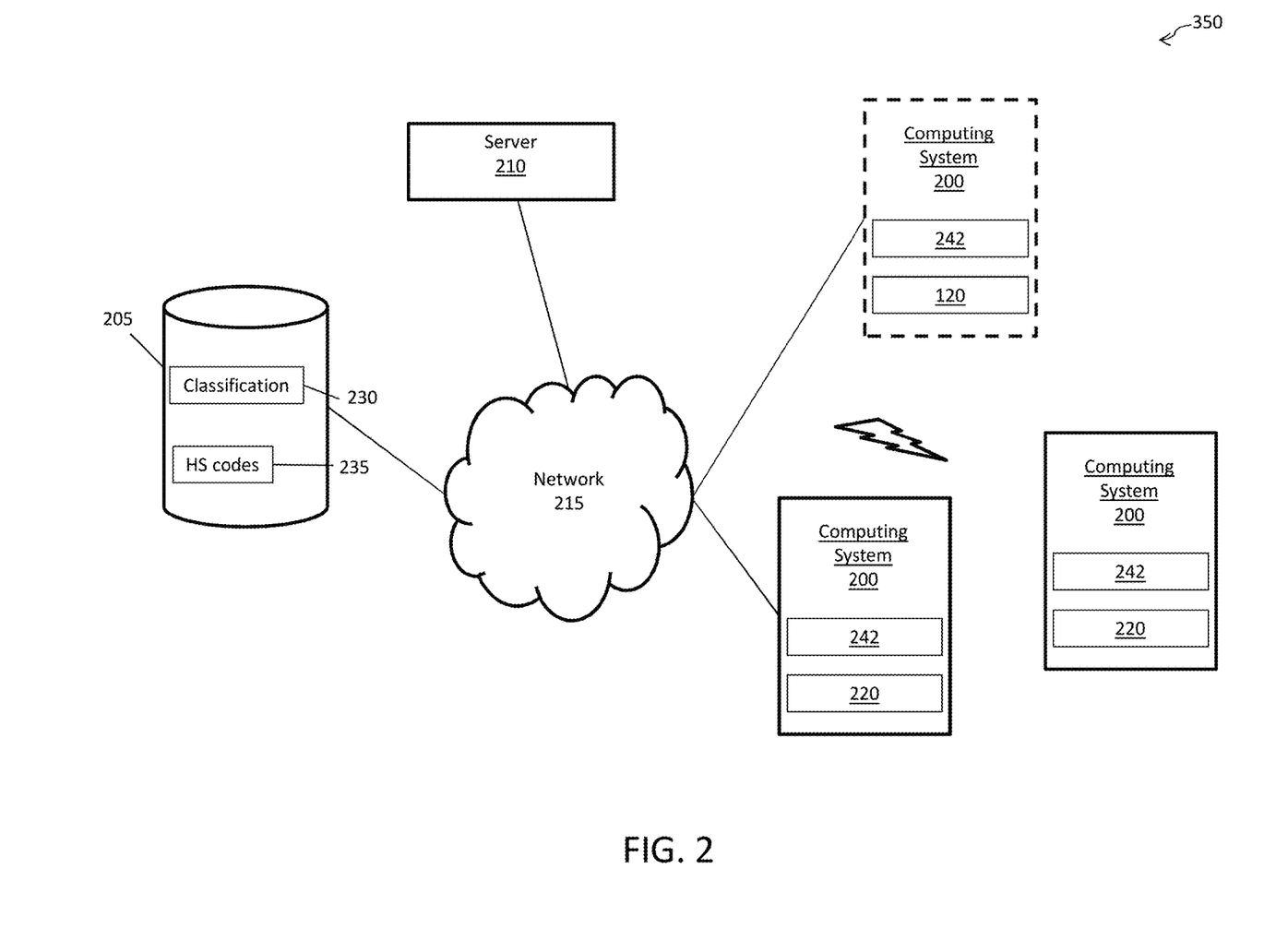
FIG. 2 illustrates a network diagram of a HS code assignment system in accordance with an exemplary embodiment.

FIG. 2 illustrates a network diagram of a HS code assignment system 250 in accordance with an exemplary embodiment. The HS code assignment system 250 can include one or more databases 205 and one or more computing systems 200, communicating over communication network 215. The computing system 200 can include a control engine 220 and an image analysis engine 242. The control engine 220 can be an executable application residing on the local computing system 200 to implement the HS code assignment system 250 as described herein. The control engine 220 can execute an object matching process (e.g., an embodiment of the object matching process 100 described herein) while implementing the HS code assignment system 250. The image analysis system 242 can be an executable application configured to perform machine vision and/or image analysis to compare images.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The one or more computing systems 200 can include one or more computers or processors configured to communicate with the databases 205 via the network 215. The one or more computing systems 200 can host one or more applications configured to interact with one or more components of the HS code assignment system 250. The databases 205 may store information/data, as described herein. For example, the databases 205 can include a classification database 230 and a HS codes database 235. The classification database 230 can store information associated with items. The information can include one or more of name, type, UPC number, vendor stock number, item number, department, category, materials, images and/or an assigned HS code. The HS codes database 235 can store information associated with HS codes and duty and tariff rates of the different items. The databases 205 can be located at one or more geographically distributed locations from the local computing system 200. Alternatively, the databases 305 can be included within the local computing system 200.

In one embodiment, one or more computing systems can receive an input associated with a new item. The input can include an item number, UPC, and/or vendor stock number. The computing system 200 can execute the control engine 220 in response to receiving the input. The control engine 220 can query the classification database 230 to retrieve information associated with items which match the input associated with the new item. The control engine 220 can calculate a percentage based on an amount the retrieved information matches the input associated with the new item. For example, the control engine 220 can retrieve information about item A and item B based on the input associated with the new item. The control engine 220 can execute a gap analysis to determine the differences between items A and B, and the new item. The control engine 220 can determine item A matches 85% with the new item and item B matches 75% with the new item, based on a comparison of the input associated with the new item and the information retrieved from the classification database 230. The control engine 220 can determine that the percentage is below a specified threshold amount. For example, the HS code assignment system 250 may require an item to match the new item over a specified threshold amount of 90%. Accordingly, the control engine 220 can determine the new item has failed to match any item based on the input.

In response to matching the new item with an item retrieved from the classification database 230, over a specified threshold, the control engine 220 can retrieve an HS code from the HS codes database 235 and assign the HS code to the new item. For example, in response to the determining item A matches the new item over 90% based on the input, the control engine 220 can retrieve a HS code assigned to the item A from the classification database 230 and can retrieve HS codes assigned to items similar to item A from the HS code database 235. The control engine 220 can assign an HS code to new item based on the retrieved HS code assigned to item A and HS codes assigned to items similar to item A.

In response to failing to match the new item with an item retrieved from the classification database 230, over a specified threshold, the control engine 220 can query the classification database 230 to determine a department of the new item, a category of the new item and/or materials that make up the new item. The control engine 220 can query the classification database 230 to retrieve any items that match all or a portion of the department, category and/or materials of the new item. For example, the control engine 220 can determine the new item is a t-shirt, assigned to the clothing department, of the garment category and is made up of cotton. The control engine 220 can retrieve item A which is a dress assigned to the clothing department, of the garment category, made up of polyester. The control engine can also retrieve item B which is a towel, assigned to the home department, of the bath category and made up of cotton. The control engine 220 can execute a gap analysis between the new item and item A and B. The control engine 220 can calculate a percentage the new item match item A and B. The control engine 220 can determine that item A is a closer match to the new item, than item B. The control engine can determine the percentage match of item A is higher than a specified threshold amount. The control engine 220 can assign an HS code to new item based on the retrieved HS code assigned to item A and HS codes assigned to items similar to item A.

In one embodiment, the control engine 220 can calculate a difference in value between the new item and the matched item. In response to determining the difference in value is greater than a threshold amount, the control engine 220 can fail to match the new item and the matched item. For example, continuing with the earlier example, the control engine can match the new item which is a t-shirt and item A, which is a dress over a specified threshold amount. However, the control engine 320 can determine the value of the dress is $800.00 and the value of the t-shirt is $5.00, based on retrieved values from the classification database 330. The control engine 220 can determine the difference in value of $795.00 is greater than a specified amount and consequently, can fail to match the new item and item A.

In one embodiment, in addition to or alternatively, the control engine 220 can receive an image of the new item. The control engine 220 instruct the image analysis module 242 to compare the image of the new item to an image of one or more items in the classification database 330, to identify one or more items that match the new item. The image analysis module 242 can use machine-vision and/or video analytics to compare the image of the new item and images of items stored in the classification database 230. The types of machine vision and/or video analytics can be but are not limited to: Stitching/Registration, Filtering, Thresholding, Pixel counting, Segmentation, Inpainting, Edge detection, Color Analysis, Blob discovery & manipulation, Neural net processing, Pattern recognition, and Gauging/Metrology.

The image analysis module 242 can transmit the most closely images of items which matched the image of the new item, to the control engine 220.

The control engine 220 can query the classification database 230 to retrieve information associated with the matched items. The control engine 220 can execute gap analysis between the matched items and the new item to determine the differences between the matched items and the new item. The control engine 220 can determine a percentage at which the matched items match the new item based on the gap analysis. In response to determining at least one of the matched item matches with the new item more than a specified threshold amount, the control engine 220 can assign an HS code to the new item based on the HS code assigned to the at least one matched item along with HS codes assigned to items similar to the at least one matched item.

In one embodiment, the control engine 220 can use machine learning to execute the gap analysis. For example, the control engine 220 can determine differences between items, based on attributes such as: item number, UPC, Vendor number, name, description, materials, and description of materials and/or image. The control engine 220 can maintain historical data of previously executed gap analyses comparing different items. The control engine 220 can determine differences between items while executing the gap analysis and the control engine 220 can weight each determined difference at a different amount while calculating a percentage at which a physical matches a different item, based on the historical data. The types of machine learning can be but are not limited to, Decision tree learning, Association rule learning, Artificial neural networks, Deep learning, Inductive logic programming, Support vector machines, Clustering, Bayesian networks, Reinforcement learning, Representation learning, Similarity and metric learning, Sparse dictionary learning, Genetic algorithms, Rule-based machine learning, and Learning classifier systems.

As a non-limiting example, the HS code assignment system 250 can be implemented with a retail store and/or e-commerce system. The items can be embodied as products for sale across different countries. The HS code can identify a duty/tariff rate for products that would be on sale in different countries.

Figure 3A:
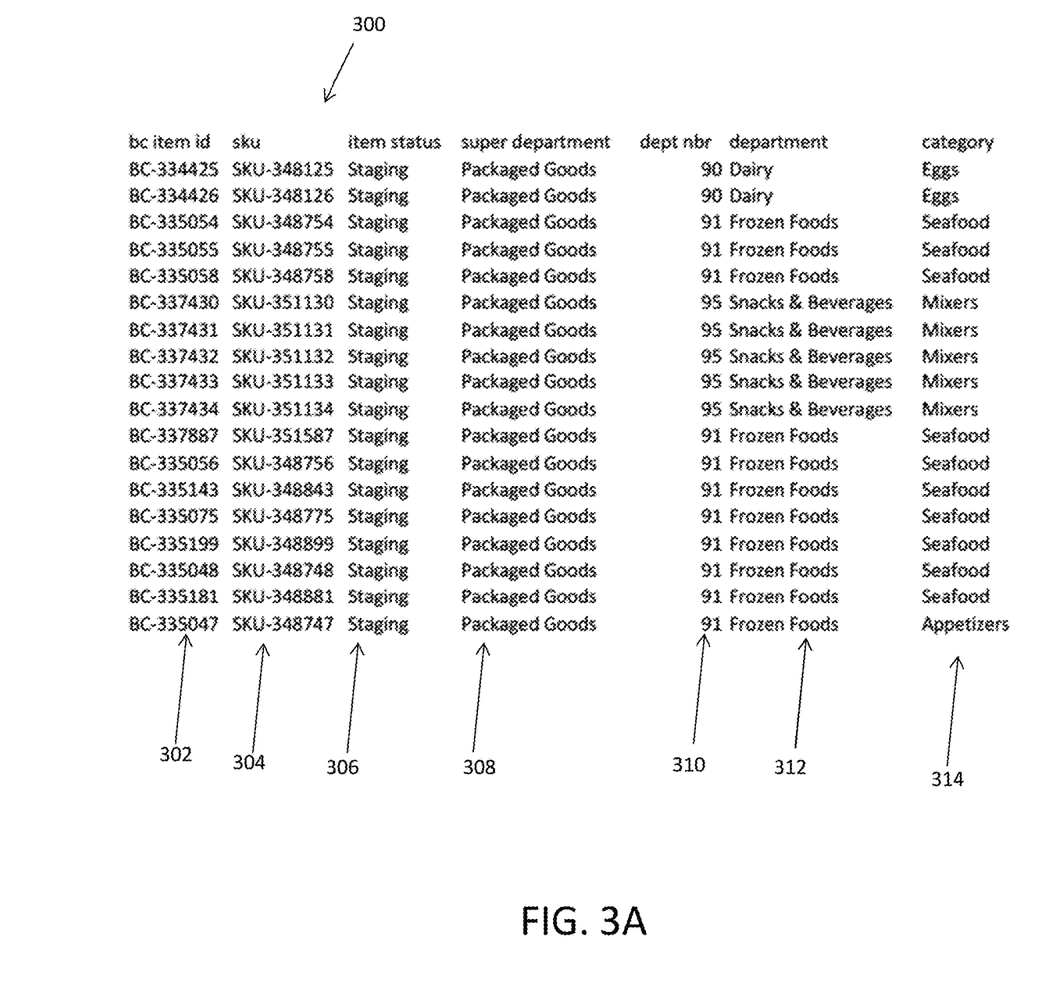
FIGS. 3A-B illustrate input and output data a HS code assignment system in accordance with an exemplary embodiment.
Figure 3B:
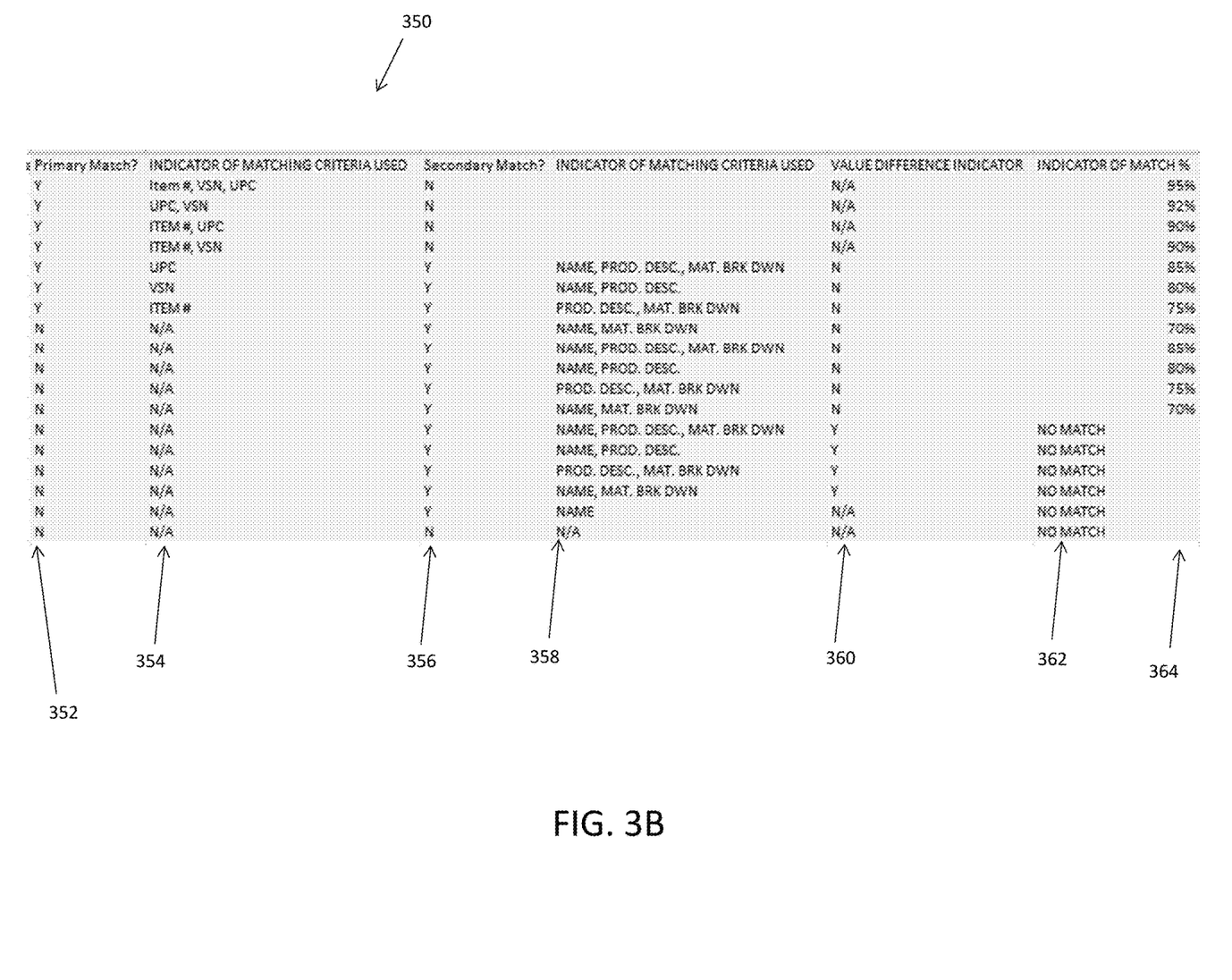

FIGS. 3A-B illustrate input and output data a HS code assignment system in accordance with an exemplary embodiment. With reference to FIG. 3A, as described herein, the computing system (computing system 200 as shown in FIG. 2) can receive an input 300 associated with a new item, to match the new item with item with a previously assigned HS code. The input can be an item ID, stock keeping unit (SKU) number, item status, super department, department number, department, and category. In exemplary embodiments, the computing system can receive additional and/or fewer items of input.

With reference to FIG. 3B, the computing system can provide an output of possible matched items. The output 350 can include whether the item is a primary match 352, indicator of criteria used to match the item if the item is a primary match 354, whether the item is a secondary match 356, indicator of matching criteria used if the item is a secondary match 358, whether there is a value difference 360, a percentage indicating the amount matched 362. It can be appreciated that the computing system can provide more or less output values. It can also be appreciated the primary match corresponds with best match (best match 102 as shown in FIG. 1) and secondary match corresponds with secondary match and/or partial match (secondary match 120, partial match 150 as shown in FIG. 1).

Figure 4A:
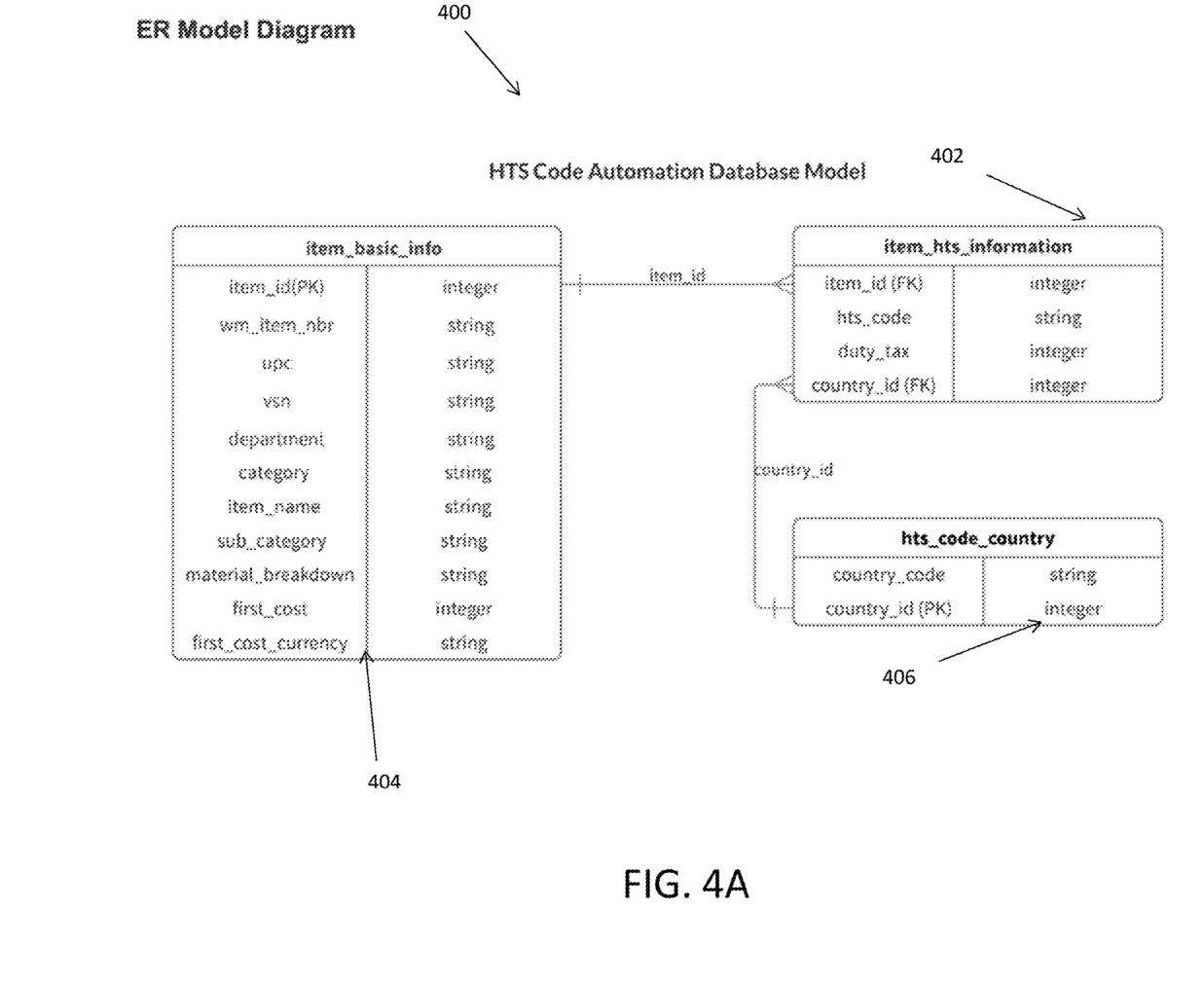
FIGS. 4A-B illustrate the database model of the HS code assignment system in accordance with an exemplary embodiment.
Figure 4B:
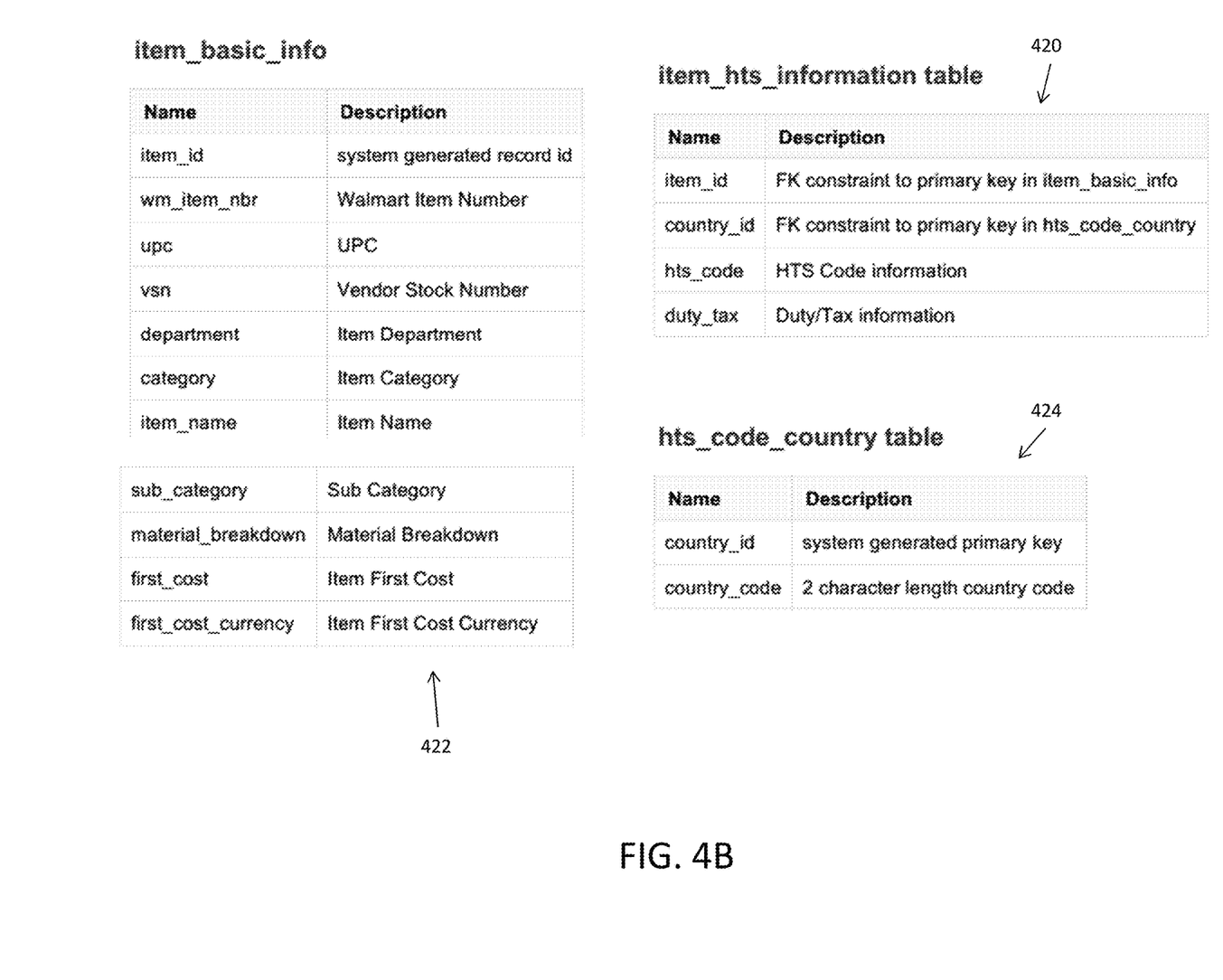

FIGS. 4A-B illustrate the database model of the HS code assignment system in accordance with an exemplary embodiment. The database model 400 can be implemented in the classification database and/or the HS codes database as described above. The database model can include a master table, item_hts_information 402. The item_hts_information 402 can store data in columns including but not limited to: item_id, hts_code, duty_tax, country_id. With reference to FIG. 4B, as described in table 420, the item_id can be a foreign key constraint to the primary key of the item_basic_info table. The country_id can be a foreign key constraint to the primary key of the hts_code_country table. The hts_code column can store HTS code information. The duty_tax column can store Duty/Tax information.

Referring again to FIG. 4A, the item_base_info table 402 have columns including but not limited to: item_id (the primary key), wm_item_nbr, UPC, vpn, department, category, item_name, sub_category, material_breakdown, first_cost, and first_cost_currency. With reference to FIG. 4B, as shown in the table 422, the item_id can be a system generated record id. The wm_item_number column can store an item number. The UPC column can store the UPC. The VSN column can store the vendor stock number. The department column can store the item department. The category column can store the item category. The item_name column can store the item name. The sub_category column can store the sub category. The material_breakdown column can store the breakdown of the items materials. The first_cost column can store the items first cost. The first_cost_currency column can store item first cost currency.

Turning back to FIG. 4A, the hts_code_country 406 can store data in columns including but not limited to: country_code and the country_id (the primary key). With reference to FIG. 4B, as shown in the table 424, the country_id can be a system generated primary key. The country_code column can store a two character length country code.

Figure 5:
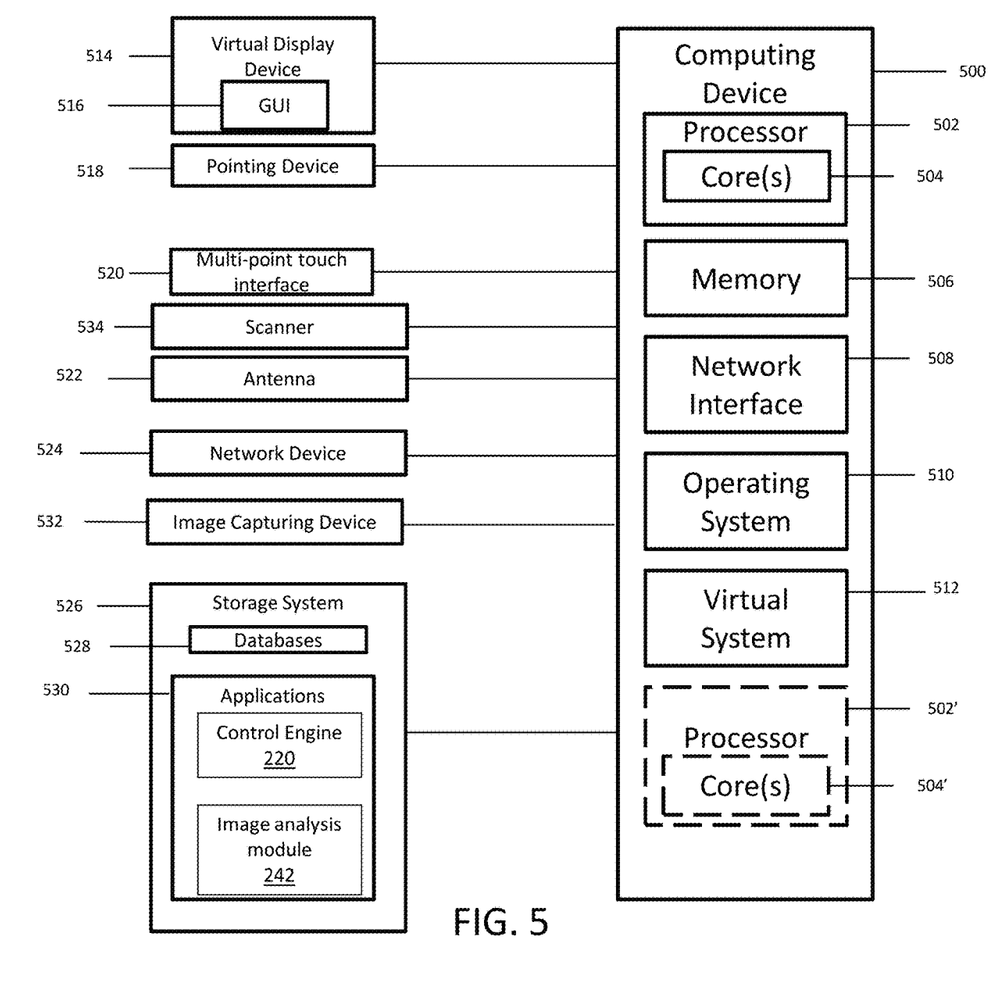
FIG. 5 illustrates a block diagram of an exemplary computing device in accordance with an exemplary embodiment.

FIG. 5 is a block diagram of an exemplary computing device suitable for implementing embodiments of the system for data transfer in a distributed environment. The computing device may be, but is not limited to, a smartphone, laptop, tablet, desktop computer, server or network appliance. The computing device 500 can be embodied as part of the computing system. The computing device 500 includes one or more non-transitory computer-readable media for storing one or more computer-executable instructions or software for implementing exemplary embodiments.

The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 330 such as the control engine 220 and image analysis module 242) for implementing exemplary operations of the computing device 500.

The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof. The computing device 500 can receive data from input/output devices such as, a reader 534 and an image capturing device 532.

A user may interact with the computing device 500 through a visual display device 514, such as a computer monitor, which may display one or more graphical user interfaces 516, multi touch interface 520 and a pointing device 518.

The computing device 500 may also include one or more storage devices 526, such as a hard-drive, CD-ROM, or other computer readable media, for storing data and computer-readable instructions and/or software that implement exemplary embodiments of the present disclosure (e.g., applications 530 such as the control engine 220 and image analysis module 242). For example, exemplary storage device 526 can include one or more databases 528 for storing information regarding the items and HS codes. The databases 528 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein.

In exemplary embodiments, the operating system 510 may be run in native mode or emulated mode. In an exemplary embodiment, the operating system 510 may be run on one or more cloud machine instances.

Figure 6:
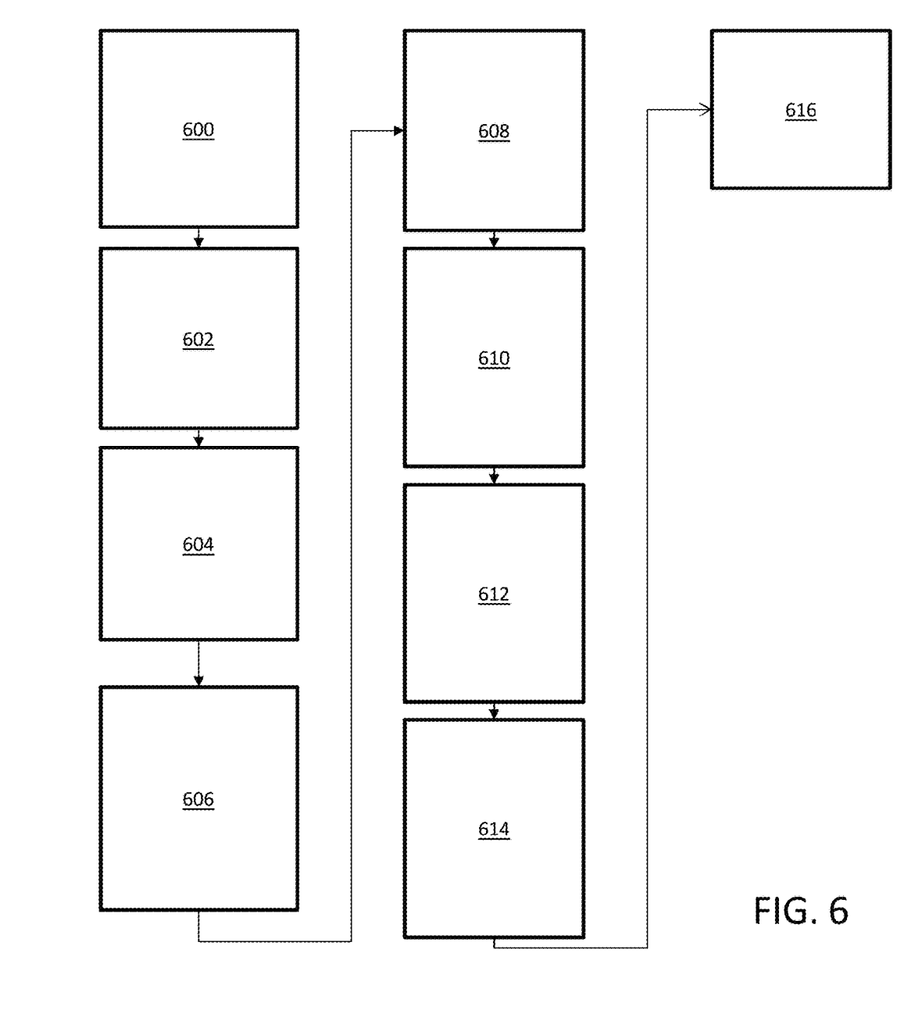
FIG. 6 is a flowchart illustrating a process implemented by a HS code assignment system according to an exemplary embodiment.

FIG. 6 is a flowchart illustrating a process implemented by an automated HS code assignment system according to an exemplary embodiment. In operation 600, a data storage facility can store HS codes and information associated with items. Each item stored in data storage facility can be assigned a HS code. In operation 602, a computing system communicatively coupled to the data storage facility, can receive a first input associated with a new item. In operation 604, the computing system can retrieve information associated with one or more items, based on the first input, from the data storage facility.

In operation 606, the computing system can compare the first input associated with new item to the information associated with the one or more items. In operation 608, the computing system can identify at least one item of the one or more physically object, based on the comparison of the first input associated with new item to the information associated with the one or more items. In operation 610, the computing system can execute a gap analysis to determine the differences between the at least one item and the new item. In operation 612, the computing system can calculate a percentage representing an amount of similarity between the new item and at least one item, in response to executing the gap analysis. In operation 614, the computing system can retrieve a HS code assigned to the at least one item, in response to determining the percentage representing the amount of similarity between the new item and at least one item is more than a threshold amount, the data storage facility. In operation 616 the computing system can assign a HS code from the plurality of HS codes, associated with the retrieved HS code assigned to the at least one item, to the new item.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. An automated Harmonized System (HS) code assignment system, the system comprising:
a computer-readable medium including a database configured to store a plurality of HS codes and information associated with a plurality of items, each of the plurality of items being assigned at least one HS code from the plurality of HS codes;

a computing system communicatively coupled to the computer-readable medium, the computing system configured to:

receive a first input associated with a new item;

retrieve, from the database, information associated with one or more items of the plurality of items, based on the first input;

compare the first input associated with the new item to the information associated with the one or more items;

identify at least one item of the one or more items, based on the comparison of the first input associated with the new item to the information associated with the one or more items;

execute a gap analysis to determine differences between the at least one item and the new item;

calculate a percentage representing an amount of similarity between the new item and the at least one item, in response to executing the gap analysis;

in response to determining the percentage is greater than a first threshold amount, calculate a difference between a value associated with the new item and a value associated with the at least one item;

determine whether the difference between a value associated with the new item and a value associated with the at least one items is greater than a second threshold amount;

in response to determining the difference between a value associated with the new item and a value associated with the at least one items is greater than a second threshold amount, fail to match the new item to the at least one item;

in response to determining the difference between a value associated with the new item and a value associated with the at least one items is less than a second threshold amount, retrieve, from the database, a HS code assigned to the at least one item; and assign a HS code from the plurality of HS codes to the new item based on the retrieved HS code assigned to the at least one item.

2. The system of claim 1, wherein in response to failing to identify the at least one item from the one or more items, based on the comparison of the first input associated with the new item to the information associated with the one or more items, the computing system retrieves from the database, materials from which the new item is made.

3. The system of claim 2, wherein the computing system is configured to:

compare the materials from which the new item is made with materials from which each of the one or more items are made;

identify the at least one item of the one or more items, based on the comparison of the materials from which the new item is made with the materials from which each of the one or more items are made.

4. The system of claim 1, wherein the computing system is configured to receive a second input associated with the new item.

5. The system of claim 4, wherein the second input is an image of the new item.

6. The system of claim 5, wherein the computing system is configured to:

compare the image of the new item to an image of each of the one or more items; and identify the at least one item based on the comparison of the image of the new item to the image of each of the one or more items.

7. The system of claim 6, wherein the computing system uses machine-visions or video analytics to compare the image of the new item to the image of each of the one or more items.

8. The system of claim 1, wherein the computing system is configured to:

maintain historical data associated with assigning the plurality of HS codes to each of the plurality of items in the database.

9. The system of claim 8, wherein the computing system is configured to:

calculate a second percentage representing an amount of similarity between the new item and the at least one item based on the historical data associated with assigning HS codes to each of the plurality of items in the data storage facility.

10. An automated Harmonized System (HS) code assignment method, the method comprising:

storing, via a computer-readable medium including a database, a plurality of HS codes and information associated with a plurality of items, each of the plurality of items assigned at least one HS code from the plurality of HS code;

receiving, via a computing system, a first input associated with a new item;

retrieving information associated with one or more items of the plurality of items from the database by the computing system based on the first input;

comparing, via the computing system, the input associated with the new item to the information associated with the one or more items;

identifying, via the computing system, at least one item of the one or more items based on the comparison of the first input associated with the new item to the information associated with the one or more items;

executing, via the computing system, a gap analysis to determine differences between the at least one item and the new item;

calculating, via the computing system, a percentage representing an amount of similarity between the new item and the at least one item in response to executing the gap analysis;

in response to determining the percentage is greater than a first threshold amount, calculating a difference between a value associated with the new item and a value associated with the at least one item;

determining whether the difference between a value associated with the new item and a value associated with the at least one items is greater than a second threshold amount;

in response to determining the difference between a value associated with the new item and a value associated with the at least one items is greater than a second threshold amount, failing to match the new item to the at least one item;

in response to determining the difference between a value associated with the new item and a value associated with the at least one items is less than a second threshold amount, retrieving a HS code assigned to the at least one item from the database by the computing system in response to determining the percentage is greater than a threshold amount; and assigning, via the computing system, a HS code from the plurality of HS codes to the new item based on the retrieved HS code assigned to the at least one item.

11. The method of claim 10, further comprising:
maintaining, via the computing system, historical data associated with assigning the plurality of HS codes to each of the plurality of items in the database.

12. The method of claim 10, further comprising in response to failing to identify the at least one item from the one or more items, based on the comparison of the first input associated with new item to the information associated with the one or more items, retrieving from the database via the computing system, materials from which the new item is made.

13. The method of claim 12, further comprising:
comparing, via the computing system, the materials from which the new item is made with materials from which each of the one or more items are made;
identifying, via the computing system, the at least one item of the one or more items, based on the comparison of the materials from which the new item is made with materials from which each of the one or more items are made.

14. The method of claim 10, further comprising receiving, via the computing system, a second input associated with the new item.

15. The method of claim 14, wherein the second input is an image of the new item.

16. The method of claim 15, further comprising:
comparing, via the computing system, the image of the new item to an image of each of the one or more items; and
identifying, via the computing system, the at least one item based on the comparison of the image of the new item to the image of each of the one or more items.

17. The method of claim 16, wherein the computing system uses machine-visions or video analytics to compare the image of the new item to the image of each of the one or more items.

18. The method of claim 11, further comprising: calculating, via the computing system, a second percentage representing an amount of similarity between the new item and the at least one item based on the historical data associated with assigning HS codes to each of the plurality of items in the data storage facility.

* * * * *